(12) United States Patent
Matsushita et al.

(10) Patent No.: US 6,678,092 B2
(45) Date of Patent: Jan. 13, 2004

(54) REFLECTION TYPE FARADAY ROTATOR WITH MULTIPLE REFLECTION STRUCTURE

(75) Inventors: Takeshi Matsushita, Iwata-gun (JP); Mitsuteru Inoue, Okazaki (JP); Hideki Kato, Iwata-gun (JP); Akio Takayama, Iwata-gun (JP)

(73) Assignee: Minebea Co., Ltd., Kitasaku-gun (JP)

( * ) Notice: Subject to any disclaimer, the term of this patent is extended or adjusted under 35 U.S.C. 154(b) by 107 days.

(21) Appl. No.: 10/123,230

(22) Filed: Apr. 17, 2002

(65) Prior Publication Data

US 2002/0149833 A1 Oct. 17, 2002

(30) Foreign Application Priority Data

Apr. 17, 2001 (JP) ......................... 2001-118523

(51) Int. Cl.[7] ......................... G02B 27/28; G02B 26/08; G02F 1/09
(52) U.S. Cl. ......................... 359/484; 359/282; 359/302
(58) Field of Search ......................... 359/484, 280–282, 359/298–302

(56) References Cited

U.S. PATENT DOCUMENTS

| 3,707,321 | A | * | 12/1972 | Jaecklin et al. | ............. 359/282 |
|---|---|---|---|---|---|
| 4,222,668 | A | * | 9/1980 | Henry | .................. 356/472 |
| 4,525,028 | A | * | 6/1985 | Dorschner | .................. 359/484 |
| 5,463,316 | A | * | 10/1995 | Shirai et al. | .............. 324/244.1 |
| 6,018,411 | A | * | 1/2000 | Fukushima et al. | ......... 359/283 |
| 6,369,933 | B1 | * | 4/2002 | O'Callaghan | ............... 359/247 |
| 6,534,977 | B1 | * | 3/2003 | Duncan et al. | .......... 324/244.1 |
| 6,545,795 | B2 | * | 4/2003 | Matsushita et al. | ......... 359/280 |
| 6,590,694 | B2 | * | 7/2003 | Matsushita et al. | ......... 359/280 |
| 2002/0139974 | A1 | * | 10/2002 | Matsushita et al. | ........... 257/39 |
| 2002/0149832 | A1 | * | 10/2002 | Matsushita et al. | ......... 359/280 |

FOREIGN PATENT DOCUMENTS

JP A 2000-312003 11/2000

* cited by examiner

*Primary Examiner*—Evelyn Lester
(74) *Attorney, Agent, or Firm*—Oliff & Berridge, PLC

(57) ABSTRACT

A reflection type Faraday rotator includes first to sixth reflection type sub-rotators. Light is made incident on the first to sixth sub-rotators while repeating reflecting thereat. A Faraday rotation occurs at a sub-rotator having a center wavelength equal to the wavelength of the light The sub-rotators are of reflection-type, have a larger bandwidth of outgoing light compared to a transmission type, and have center wavelengths (wavelength characteristics) different from one another. Thus, the effective wavelength range (the wavelength bandwidth) is increased. Expensive optical devices conventionally required for increasing the wavelength bandwidth are not needed. Accordingly, the cost can be reduced.

17 Claims, 8 Drawing Sheets

Faraday Rotation Angle
by Transmission Type

Outgoing Light Ratio by
Transmission Type (Transmittance)

Faraday Rotation Angle
by Reflection Type

Outgoing Light Ratio by
Reflection Type (Reflectivity)

REFLECTION TYPE FARADAY ROTATOR WITH MULTIPLE REFLECTION STRUCTURE

BACKGROUND OF THE INVENTION

1. Field of the Invention

The present invention relates to a reflection type Faraday rotator which constitutes an optical isolator and an optical circulator used in optical-fiber communication, optical recording, optical measuring systems, and so forth.

2. Description of the Related Art

In optical fiber communication systems using semiconductor lasers as light sources, especially in optical systems by the high-speed digital transmission and the analog direct modulation method, when reflected light from optical connector junctions, optical circuit components, etc., used in optical-fiber circuits returns to the semiconductor lasers or optical amplifiers, frequency characteristics are degraded, and noises are generated, thereby giving difficulty to high quality transmission. In order to eliminate the reflected light, an optical isolator has been used.

The aforementioned optical isolator is composed mainly of a polarizer and an analyzer both of which transmit light of a specific plane of polarization only, a Faraday rotator for rotating the plane of polarization for the light by 45 degrees, and a permanent magnet for applying a magnetic field to the Faraday rotator.

The performance of the optical isolator depends primarily on the Faraday rotator among the above-mentioned constituents. The Faraday rotator is required to have a small length of an element for rotating the plane of polarization by 45 degrees and a large light transmittance. As the Faraday rotator, there are a bulk single crystal (thickness of about 2 mm) of yttrium iron garnet (YIG), a thick film single crystal (thickness of about several hundred micrometers) of bismuth-substituted rare-earth iron garnet (BiYIG), in which bismuth having a large magneto-optical performance index has substituted for part of yttrium, and so forth. Recently, the BiYIG tick film single crystal advantageous in downsizing the optical isolator has been used in many cases.

Moreover, recently, there has been proposed a Faraday rotator (magneto-optical member) made of one-dimensional magneto-photonic crystal which brings about the enhancement of a magneto-optical effect (the Faraday effect is a kind of the magneto-optical effect) due to the localization of light. Since the Faraday rotator (magneto-optical member) made of one-dimensional magneto-photonic crystal can provide a large Faraday rotation angle with a thickness of as small as several micrometers, optical isolators are expected to be significantly downsized and manufactured at a reduced cost.

The one-dimensional magneto-photonic crystal is structured such that at least one kind of dielectric thin film and a magneto-optical thin film are laminated so as to form a Fabry-Perot resonator structure. It has been recognized that the magneto-optical effect can be significantly increased in particular when a magneto-optical thin film is sandwiched between two periodic dielectric multilayer films each structured such that two kinds of dielectric thin films having refractive indexes different from each other are laminated.

However, in the above-described simple structure, when the number of layers of the periodic dielectric multilayer films is increased for increasing a Faraday rotation angle, light transmittance is lowered. It has been revealed that this problem can be solved by stacking a plurality of Fabry-Perot resonators so as to sandwich a dielectric thin film. However, this method increases significantly the number of layers and the manufacturing cost.

Under the circumstances, the inventors have invented a Faraday rotator (reflection type laminate film Faraday rotator) which has a metal reflection film formed on the top or bottom surface of the laminate film in the direction of lamination, and in which light is made incident on a side having the metal reflection film not formed on and is reflected at an opposite side where the metal reflection film is present. Then, the optimization of the structure of the reflection type Faraday rotator was examined. As a result, satisfactory magneto-optical characteristics could be obtained with a significantly smaller number of layers compared with a conventional transmission type Faraday rotator. The reflection type Faraday rotator does not have to include a metal reflection film for achieving reflection function. Satisfactory reflection characteristics can be given by appropriately structuring the dielectric multilayer films.

FIG. 14 shows an example of the configuration of an optical isolator using a reflection type laminate film Faraday rotator. FIG. 15 shows the film structure of the reflection type laminate film Faraday rotator.

In FIG. 14, an optical isolator 1 comprises a polarizer 2 and an analyzer 3 both of which transmit only light component having a specific plane of polarization, a reflection type laminate mm Faraday rotator 4 which rotates the plane of polarization of light by 45 degrees, and a permanent magnet (not shown) for applying a magnetic field to the Faraday rotator 4. In FIG. 15, the Faraday rotator 4 comprises a substrate 5, and a laminate film 6 formed on the substrate 5. The laminate film 6 comprises two periodic dielectric multilayer films 9 and 10 each comprising two kinds of dielectric thin films 7 and 8, a magneto-optical thin film 11 sandwiched between the two periodic dielectric multilayer films 9 and 10, and a metal reflection film 12 formed on a side of the periodic dielectric multilayer film 9 near the substrate 5.

From the standpoint of increasing a communication capacitance, the wavelength division multiplexing system (WDM), in which light with a plurality of wavelengths is transmitted through one optical fiber, is may used. The wavelength interval ranges from 0.4 to 1.6 nm. Accordingly, a wavelength band of 60 nm is required for WDM of 40 channels. Thus, an optical isolator and, also, a Faraday rotator are required to have a wavelength band of at least 60 nm. The bandwidth is further increasing and the WDM system is under development.

However, since the Faraday rotator including a laminate film has a small wavelength range for operation, it is difficult for one Faraday rotator to cover a wide wavelength range though it can act on a specific wavelength. For increasing the wavelength bandwidth of the laminate film Faraday rotator, the inventors have proposed, in Japanese Patent Application No. 2000-312003, an optical device which has a function of changing the incidence position and angle of light incident on a laminate film, depending on the wavelength of the incident light. Specifically, the optical device comprises a prism spectroscope or diffraction grating, which requires special design and processing technique for production, pushing up cost of the Faraday rotator.

And, further reduction of the number of layers of the laminate film which constitutes the Faraday rotator is required.

SUMMARY OF THE INVENTION

The present invention was made in light of the above, and it is therefore an object of the present invention to provide a reflection type Faraday rotator which can increase the wavelength bandwidth and reduce the cost.

According to a first aspect of the present invention, a reflection type Faraday rotator comprises a plurality of sub-rotators which each include a laminate Mm at least comprising an magneto-optical thin film and at least one kind of dielectric thin film, have reflection characteristics, have wavelength characteristics different from one another, and which are arranged so that reflected light from one sub-rotator is made incident on another sub-rotator in sequence.

According to a second aspect of the present invention, a reflection type Faraday rotator comprises at least three sub-rotators which each include a laminate film at least comprising a magneto-optical thin film and at least one kind of dielectric thin film, have reflection characteristics, wherein at least two sub-rotators have an identical wavelength characteristic but a different wavelength characteristic from at least one sub-rotator, and which are arranged so that reflected light from one sub-rotator is made incident on another sub-rotator in sequence.

According to a third aspect of the present invention, a reflection type Faraday rotator comprises at least one sub-rotator which each include a laminate film at least comprising a magneto-optical thin film and at least one kind of dielectric thin film and having a constant thickness, and which has a reflection characteristics, and at least one reflector which is disposed so as to face the laminate film thereby being adapted to receive and reflect reflected light from the sub-rotator.

According to a forth aspect of the present invention, a reflection type Faraday rotator comprises at least one sub-rotator which each include a laminate film at least comprising a magneto-optical thin film and at least one kind of dielectric thin film and having a thickness changed linearly or stepwise, and which has reflection characteristics, and at least one reflector which is disposed so as to face the laminate film of the sub-rotator thereby receiving and reflecting reflected light from the sub-rotator.

According to a fifth aspect of the present invention, a reflection type Faraday rotator comprises at least one sub-rotator which each include a laminate film at least comprising a magneto-optical thin film and at least one kind of dielectric thin film and having a constant thickness and which has reflection characteristics, and at least one reflector which is disposed so as to face the laminate film of the sub-rotator at a predetermined inclination angle with respect to the laminate film thereby receiving and reflecting reflected light from the sub-rotator.

According to a sit aspect of the present invention, a reflection type Faraday rotator is provided in which a transparent substrate is sandwiched between the laminate film and the reflector.

According to a seventh aspect of the present invention, a reflection type Faraday rotator is provided in which a sub-rotator which includes a laminate film at least comprising a magneto-optical thin film and at least one kind of dielectric thin film, and which has reflection characteristics, is provided instead of the reflector.

According to an eighth aspect of the present invention, a reflection type Faraday rotator is provided in which the laminate film comprises two periodic dielectric multilayer films each comprising two kinds of dielectric thin films with different refractive indexes, a magneto-optical thin film sandwiched between the two periodic dielectric multilayer films, and a metal thin film formed on a side of one periodic dielectric multilayer film of the two opposite to a side in contact with the magneto-optical thin film.

DESCRIPTION OF THE PREFERRED EMBODIMENTS

Figure 1:
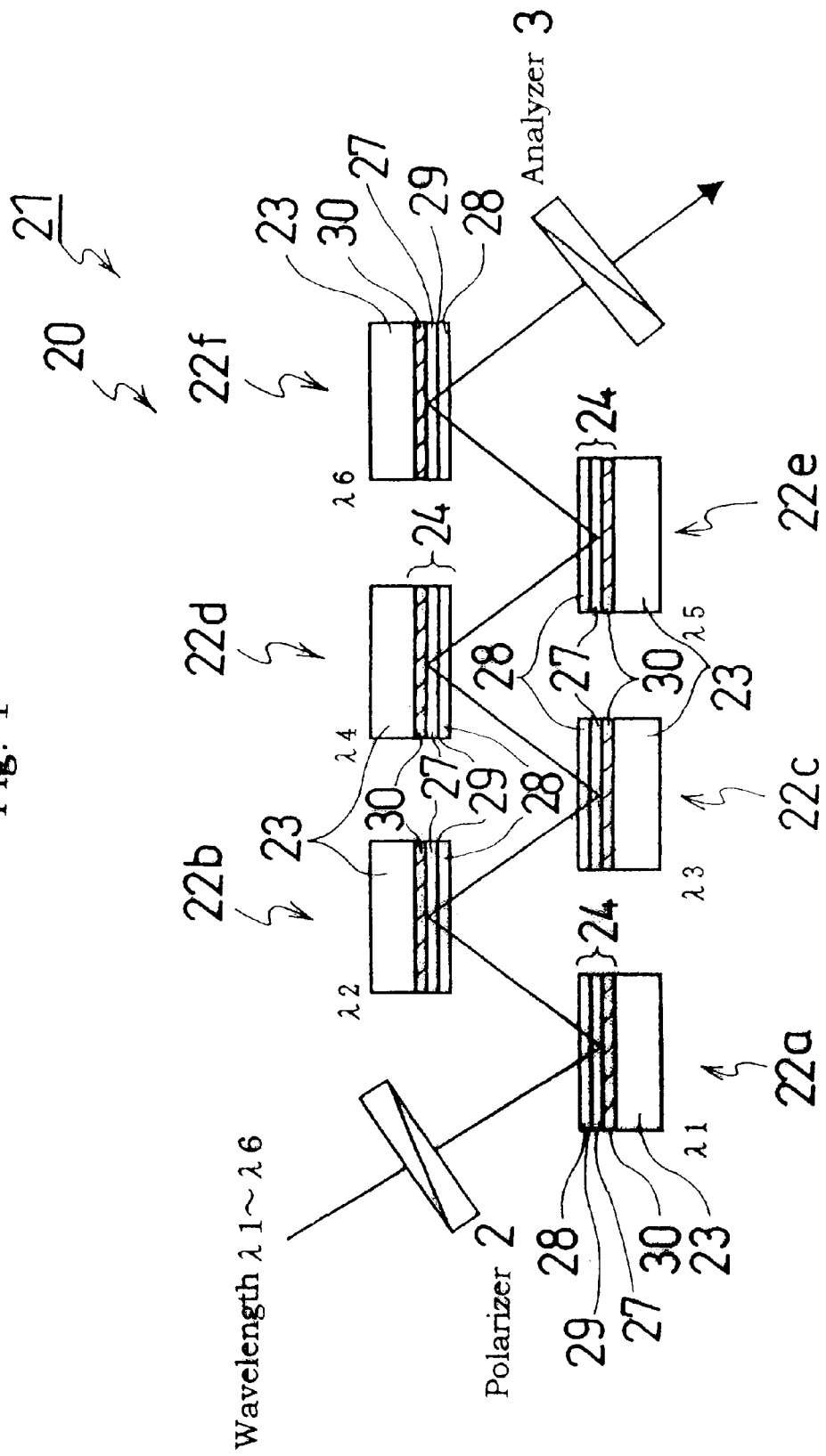
FIG. 1 is a schematic illustration of a reflection type Faraday rotator according to a first embodiment of the present invention.
Figure 2:
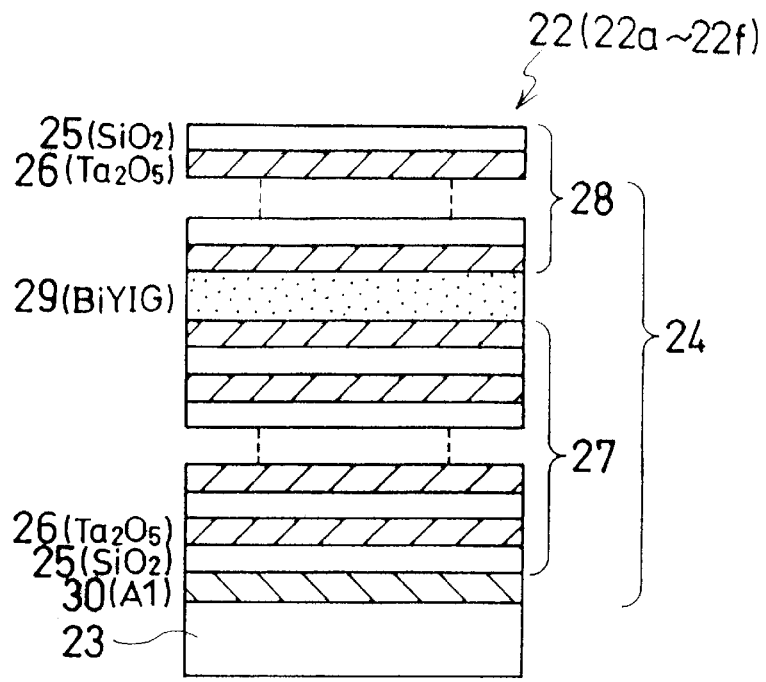
FIG. 2 is a schematic cross-sectional view of the film structure of each of sub-rotators constituting the reflection type Faraday rotator of FIG. 1.
Figure 14:
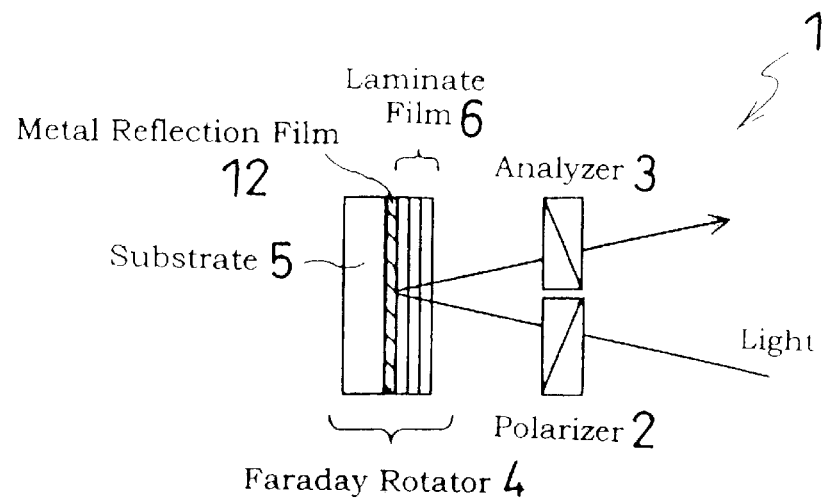
FIG. 14 illustrates an example of an optical isolator using a conventional reflection type laminate film Faraday rotator.
Figure 15:
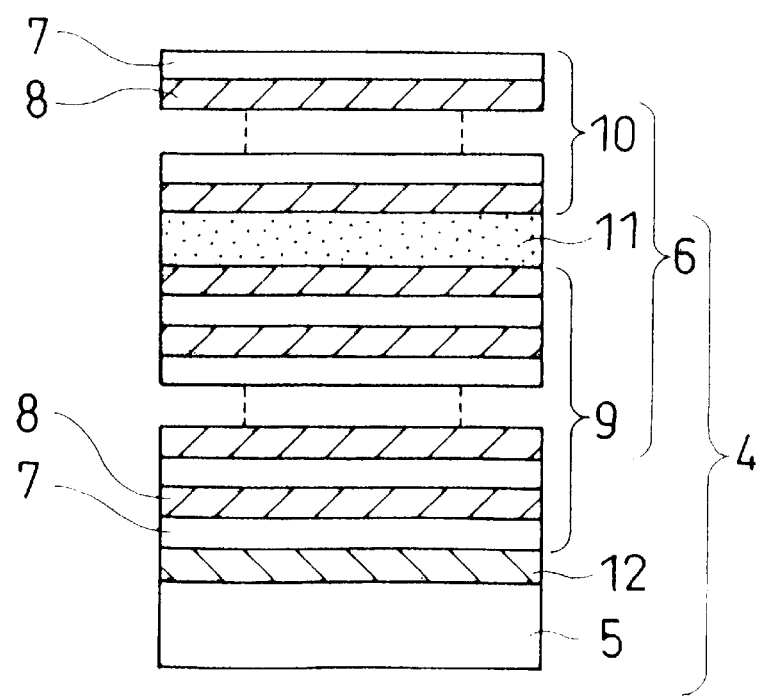
FIG. 15 is a schematic cross-sectional view of an example of the film structure of a conventional reflection type laminate film Faraday rotator.

Hereinafter, a reflection type Faraday rotator 20 according to a first embodiment of the present invention will be described with reference to FIGS. 1 and 2. In FIGS. 1 and 2, the members or parts identical with or similar to those shown in FIGS. 14 and 15 are designated by the same reference numerals. The repeated description is omitted at discretion.

Prior to describing the first embodiment, the wavelength characteristics of a reflection type laminate film Faraday rotator (hereinafter referred to as reflection type Faraday rotator) and a transmission type laminate film Faraday rotator (hereinafter transmission type Faraday rotator) will be explained with reference to FIGS. 12A, 12B, 12C, 12D, and 13.

The reflection type Faraday rotator has a small wavelength bandwidth for a Faraday rotation angle as well as the transmission type Faraday rotator, but has a very large bandwidth of outgoing light compared with the transmission type Faraday rotator.

Figure 12A:
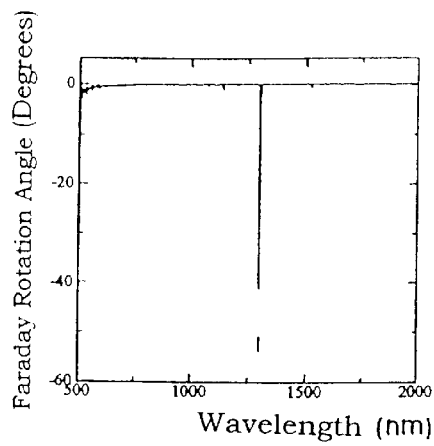
FIGS. 12A, 12B, 12C, and 12D are graphs showing the Faraday rotation angles and the outgoing light ratios of a reflection type Faraday rotator in comparison with a transmission type Faraday rotator.
Figure 12B:
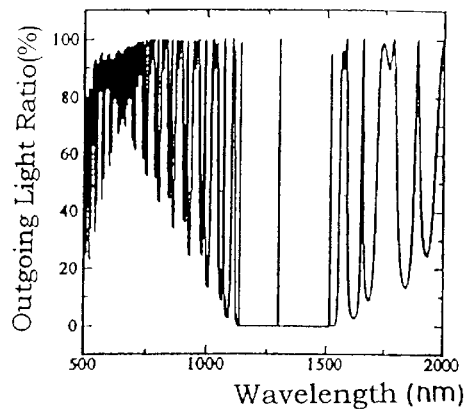
Figure 12C:
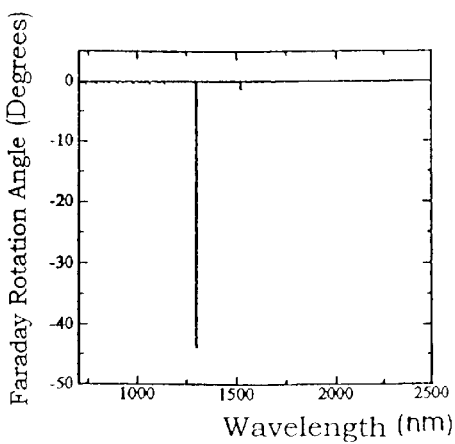
Figure 12D:
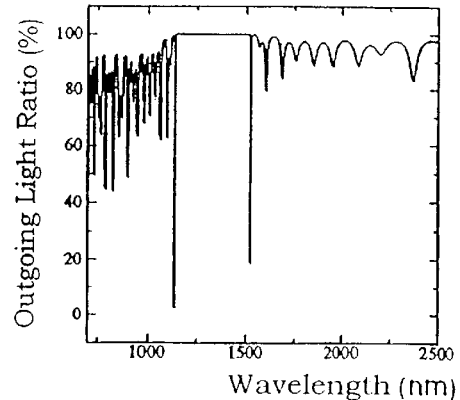

FIGS. 12A and 12B show the wavelength characteristics of a typical transmission type Faraday rotator with its center wavelength designed to be 1300 nm. FIGS. 12C and 12D show the wavelength characteristics of a typical reflection type Faraday rotator with its center wavelength designed to be 1300 nm. In both the transmission type Faraday rotator and the reflection type Faraday rotator, a Faraday rotation is generated only in the vicinity of a wavelength of 1300 nm (this wavelength is called center wavelength) as shown in FIGS. 12A and 12C.

Referring to outgoing light (transmitted light in the transmission type Faraday rotator, and reflected light in the reflection type Faraday rotator), the transmission type Faraday rotator has an outgoing light ratio of 100% only In the vicinity of 1300 nm as shown in FIG. 12B. On the other hand, the reflection type Faraday rotator has an outgoing light ratio of 100% in a wide wavelength range of 1200 to 1500 nm as shown in FIG. 12D.

Figure 13:
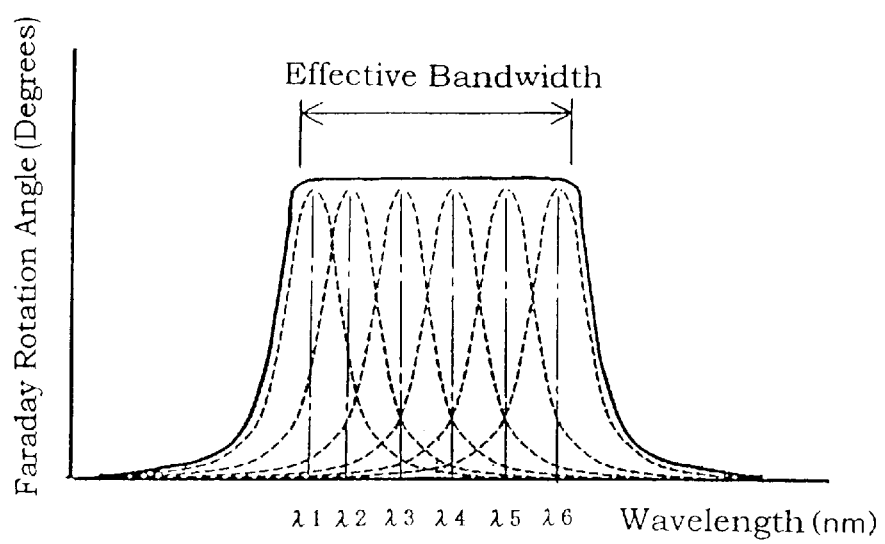
FIG. 13 is a graph showing the effective wavelength bandwidth obtained when reflection type sub-rotators are combined for multiple reflection function.

Accordingly, when a plurality of reflection type sub-rotators which can operate at respective different wavelengths (wavelength characteristics, center wavelengths) are arranged so that light can be made incident sequentially on and reflected at all the sub-rotators one after another as described later, a Faraday rotation occurs only at a sub-rotator having a center wavelength equal to the wavelength of the incident light, and the light is reflected, with substantially no Faraday rotation and no light loss, at the other sub-rotators whose center wavelength is not equal to the wavelength of the incident light. Thus, the sub-rotators combined for multiple reflection function constitutes a Faraday rotator which has a wide effective wavelength range as shown in FIG. 13. In FIG. 13, λ1 to λ6 correspond to respective center wavelengths (wavelength characteristics) of first to sixth sub-rotators according to the first embodiment.

As shown in FIG. 1, an optical isolator 21 is constituted by the reflection type Faraday rotator 20 according to the first embodiment, a polarizer 2 and an analyzer 3 both of which transmit only light component having a specific plane of polarization, and a permanent magnet (not shown) for applying a magnetic field to the reflection type Faraday rotator 20.

The reflection type Faraday rotator 20 comprises six sub-rotators 22 (a fist sub-rotator 22a through a sixth sub-rotator 22f). The first to sixth sub-rotators 22a to 22f have center wavelengths (wavelength characteristics) λ1 to λ6 (λ1<λ2<λ3<λ4<λ5<λ6), respectively.

The first to sixth sub-rotators 22a to 22f each include a laminate film 24. The thickness of each of layers constituting the laminate film 24 is determined considering the center wavelengths and the incident angles on the multilayer film (the laminate film 24). The first to sixth sub-rotators 22a to 22f are equal in fundamental film constitution (components and the like). The constitution will be described below taking the first sub-rotator 22a as an example.

The first sub-rotator 22a comprises a substrate 23 and the laminate film 24 formed on the substrate 23. As shown in FIG. 2, the laminate film 24 comprises two periodic dielectric multilayer films (a first periodic dielectric multilayer film 27, and a second periodic dielectric multilayer film 28), each comprising two kinds of dielectric thin films, that is, a dielectric thin film 25 with a lower refractive index ($SiO_2$, refractive index: 1.42) (hereinafter called "lower refractive dielectric thin film") and a dielectric thin film 26 with a higher refractive index ($Ta_2O_5$, refractive index: 2.14) (hereinafter called "higher refractive dielectric thin film"), a magneto-optical thin film 29 (bismuth-substituted rare earth iron garnet (BiYIG), refractive index: 2.36) sandwiched between the first and second periodic dielectric multilayer films 27 and 28, and a metal reflection film 30 (Al) formed on the first periodic dietetic multilayer film 27 at a side near the substrate 23.

The metal reflection film 30 may be a hard magnetic thin film made of SmCo or the like which applies a magnetic field to the magneto-optical thin film. And, the substrate 23 may be of a hard magnetic substance such as a ferrite magnet or the like which applies a magnetic field to the magneto-optical thin film.

The first periodic dielectric multilayer film 27 has a film structure $(Ta_2O_5/SiO_2)^Y$, and the second periodic dielectric multilayer film 28 has a film structure $(SiO_2/Ta_2O_5)^X$ (X<Y). The film structure of the first sub-rotator 22a is $(SiO_2/Ta_2O_5)^X/BiYIG/(Ta_2O_5/SiO_2)^Y/Al$ (X<Y).

For production of the first sub-rotator 22a, first of all, Al (metal reflection film 30) with a thickness of at least 100 nm is formed on the substrate 23. In this case, the substrate 23 need not be transparent. Here, thin film forming techniques such as sputtering, vapor-deposition, and so forth may be applied.

Subsequently, the lower refractive dielectric thin film 25 ($SiO_2$) is formed so as to have, e.g., an optical length of λ/4 (λ designates the wavelength of light) (this optical length is determined for each of the sub-rotators to ensure a desired center wavelength), considering the incidence angle of light, then, the higher refractive dielectric thin film 26 ($Ta_2O_5$) having, e.g., an optical length of λ/4 (this optical length is determined for each of the sub-rotators to ensure a desired center wavelength) is formed. This process is repeated Y times, whereby the first periodic dielectric multilayer film 27 $(Ta_2O_5)/(SiO_2)^Y$ which functions as one reflecting mirror of a Fabry-Perot resonator is formed.

Subsequently, BiYIG (the magneto-optical thin film 29) having, e.g., an optical length of λ/2 (this optical length is determined for each of the sub-rotators to ensure a desired center wavelength) is formed on the first periodic dielectric multilayer film 27. Also here, the thin film forming techniques used for forming the metal reflection film can be applied, but the composition of the magneto-optical thin film 29 must be accurately controlled to obtain a predetermined Faraday effect.

When BiYIG is used as the magneto-optical thin film 29, the thin film has an amorphous structure and exhibits no magnetism. Therefore, the thin film needs to be subjected to a heat treatment at a high temperature for crystallization. The heat treatment can be conducted in an ordinary electric furnace, depending on the combination the dielectric thin films of two kinds and the heat treatment temperature. If the heat treatment causes a problem of disturbance in the multilayer film structure and the metal reflection film, the infrared beam heating device proposed by the inventors in Japanese Patent Application No. 11-283512 may be used.

Next, the second periodic dielectric multilayer film 28 $((SiO_2/Ta_2O_5)^X$ multilayer film) which functions as the other reflecting mirror is formed. Thus, the laminate film 24 is completed.

The laminate film 24 produced by the above-described process is cut to a predetermined size together with the substrate 23 by means of a dicing machine, which completes the formation of a sub-rotator 22 having a Mm-structure of the $(SiO_2/Ta_2O_5)^X/BiYIG/(Ta_2O_5/SiO_2)^Y/Al$ (X<Y). The sub-rotators 22 need to have a laminate film structured so as to minimize loss of light. In this embodiment, the laminate film 24 is structured as shown in FIG. 2 thereby suppressing loss of light.

As shown in FIG. 1, the reflection type Faraday rotator 20 is structured such that the first, third, and fifth sub-rotators 22a, 22c, and 22e are arranged in line flush with each other with respective second periodic dielectric multilayer films 28 facing upward, while the second, fourth, and sixth sub-rotators 22b, 22d, and 22f are arranged in line flush with each other with respective second periodic dielectric multi-layer films 28 facing downward. The first, third, and fifth sub-rotators 22a, 22c, and 22e and the second, fourth, and si sub-rotators 22b, 22d, and 22f are arranged away from each other at a predetermined distance, and horizontally shifted from each other (for example, the second sub-rotator 22b is positioned between the first and third sub-rotators 22a arid 22c) so as to diagonally oppose each other.

Since the first to sixth sub-rotators 22a to 22f are arranged as described above, light from the polarizer 2 is made incident on the first sub-rotator 22a and reflected thereby; the reflected light from the first sub-rotator 22a is made incident on the second sub-rotator 22b and reflected thereby; thereafter, the light is similarly made incident on and reflected at the third to sixth sub-rotators 22c to 22f sequentially; and the reflected light from the sub-rotator 22f is made incident on the analyzer 3. That is, the first to sixth sub-rotators 22a to 22f are arranged so that reflected light from one sub-rotator is made incident on the next sub-rotator, and that this process takes place sequentially from the sub-rotator 22a through to 22f.

In the reflection type Faraday rotator 20 structured as described above, light from the polarizer 2 is made incident on and reflected by all of the sub-rotators 22a to 22f sequentially. Thus, the Faraday rotation occurs at a sub-rotator whose center wavelength is equal to the wavelength of light. Specifically, for light having a wavelength $\lambda 1$, the Faraday rotation occurs at the sub-rotator 22a whose center wavelength (wavelength characteristic is equal to $\lambda 1$. And, for light having a wavelength $\lambda 2$, the Faraday rotator occurs at the sub-rotator 22b whose center wavelength is equal to $\lambda 2$. Similarly, for lights having wavelengths $\lambda 3$ to $\lambda 6$, the Faraday rotation occurs at the third to sixth Faraday rotators 22c to 22f, respectively, whose respective center wavelengths are equal to $\lambda 3$ to $\lambda 6$.

When light is made incident on a sub-rotator whose center wavelength is not equal to the wavelength of the light, the light undergoes no Faraday rotation and passes through it without any loss.

Moreover, the first to sixth sub-rotators 22a to 22f, which are of reflection type, have a very large bandwidth of outgoing light compared to a transmission type as described with reference to FIGS. 12A, 12B, 12C, 12D and 13, and have an outgoing light ratio of 100% in a wide wavelength range of, for example, 1200 to 1500 nm.

Figure 3:
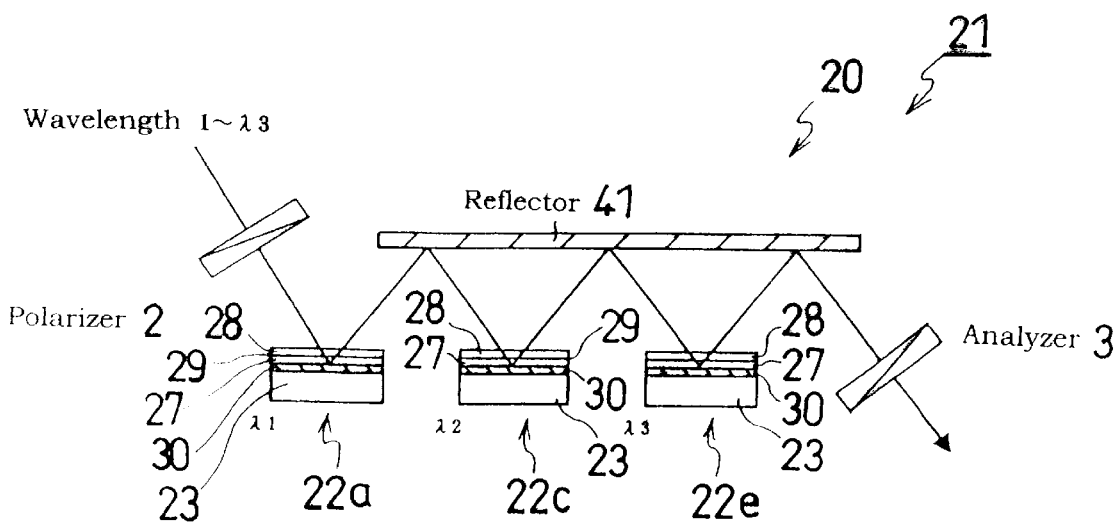
FIG. 3 is a schematic illustration of a reflection type Faraday rotator according to a second embodiment of the present invention.
Figure 4:
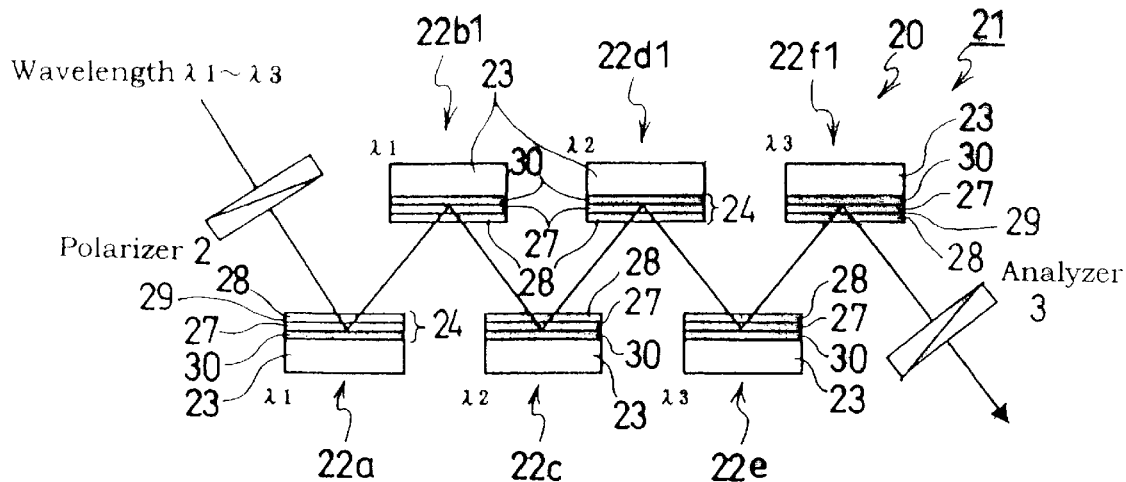
FIG. 4 is a schematic illustration of a reflection type Faraday rotator according to a third embodiment of the present invention.

Since the first to sixth sub-rotators 22a to 22f which have respective center wavelengths $\lambda 1$ to $\lambda 6$ different from one another are arranged so that it can be made incident on and reflected by the first to sixth sub-rotators 22a to 22f sequentially, light, which is made on a sub-rotator whose center wavelength is equal to the wavelength of the incident light, undergoes a Faraday rotation, while the light undergoes nearly no Faraday rotation at the other sub-rotators having a center wavelength not equal to the wavelength of the light and is reflected thereat without loss of light as described above. Therefore, the reflection type Faraday rotator 20 comprising the fist to sixth sub-rotators 22a to 22f combined has as a whole an increased effective wavelength range as described with reference to FIG. 3. That is, the wavelength bandwidth can be increased.

Moreover, the wavelength bandwidth can be increased with a relatively simple configuration without using expensive optical devices such as a prism spectroscope, a diffraction grating, or the like which are conventionally needed for increasing the wavelength bandwidth. Thus, the cost can be reduced.

In the first embodiment, the first to sixth sub-rotators 22a to 22f having respective center wavelengths (wavelength characteristics) $\lambda 1$ to $\lambda 6$ are provided. If the wavelengths of incident laser beams are previously known, sub-rotators may be provided which have center wavelengths tuned to the wavelengths of the beams.

At least one reflector 41 may be provided instead of the second, fourth, and sit sub-rotators 22b, 22d, and 22f, and positioned so as to face the laminate films of the first, third, and fifth sub-rotators 22a, 22c, and 22e, whereby reflected light from the first, the third, and the fifth sub-rotators 22a, 22c, and 22c can be made incident on and reflected at the reflector 41 (second embodiment).

The reflector may be a metal plate polished to an optically fine level, or a glass substrate polished to an optically fine level and having a reflection film made of a metal or a dielectric multi-layer film formed thereon. The metal may be Al, or a hard magnetic thin film made of SmCo or the like for applying a magnetic field to the magneto-optical thin film.

According to the second embodiment, the effective wavelength range is increased similarly to the first embodiment. That is, the wavelength bandwidth can be increased, and the increase can be achieved by a relatively simple configuration. Thus, the cost can be reduced.

In the first embodiment, the second, fourth, and sixth sub-rotators 22b, 22d, and 22f are used which have the center wavelengths $\lambda 2$, $\lambda 4$, and $\lambda 6$, respectively. Alternatively, second, fourth, and sixth sub-rotators 22b1, 22d1, and 22f1 having center wavelengths $\lambda 1$, $\lambda 2$, and $\lambda 3$ may be used instead of the second, fourth, and sixth sub-rotators 22b, 22d, and 22f, wherein the Faraday rotation angles of the first, third, and fifth sub-rotators 22a, 22c, and 22d, and the second, fourth, and sixth sub-rotators 22b1, 22d1, and 22f1 are each set at 22.5° (third embodiment).

In the third embodiment, the effective wavelength range can be increased, that is, the wavelength bandwidth can be increased similarly to the first embodiment, and the increase of the wavelength bandwidth can be achieved with a relatively simple configuration, and the number of layers of the laminate film constituting each sub-rotator can be decreased. Thus, the cost can be reduced.

A reflection type Faraday rotator 20 according to a fourth embodiment of the present invention will be described with reference to FIG. 5.

Figure 5:
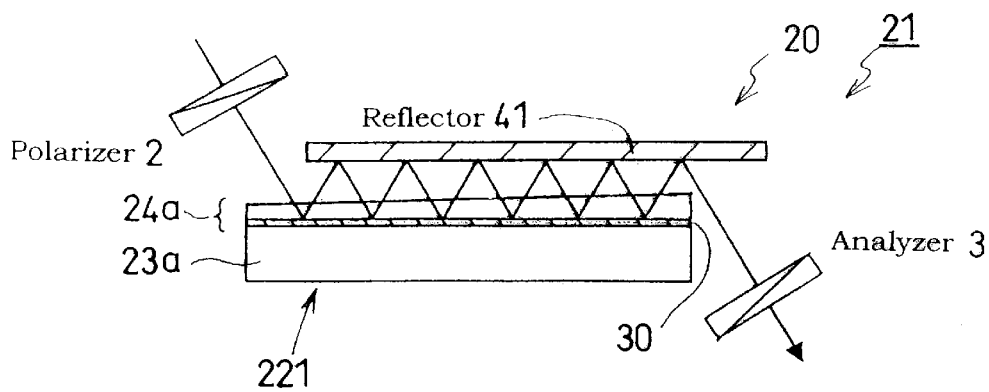
FIG. 5 is a schematic illustration of a reflection type Faraday rotator according to a fourth embodiment of the present invention.

As shown in FIG. 5, the reflection type Faraday rotator 20 according to the fourth embodiment comprises generally a sub-rotator 221 and at least one reflector 41. The sub-rotator 221 is formed on a substrate 23a, includes a laminate film 24a formed on the substrate 23a and having its thickness linearly increasing from the left end located near the polarizer 2 toward the right end located near the analyzer 3 in FIG. 5, and has reflection characteristics. The reflector 41 is positioned so as to face the laminate film 24a, whereby reflected light from the sub-rotator 221 is made incident on and reflected at the reflector 41. The reflector 41 is arranged in parallel to the substrate 23a. Light made incident at a predetermined angle on one part near the left end (in FIG. S) of the laminate film 24a propagates between the laminate film 24a and the reflector 41 while repeating reflection at the laminate film 24a and at the reflector 41, and eventually exits from another part near tie right end of the laminate film 24a.

In the reflection type Faraday rotator 20 of the second embodiment (FIG. 3), the separate (first, third, and fifth) sub-rotators 22a, 22c, and 22e are provided individually which have center wavelengths tuned to respective wavelengths of incident light On the other hand, in the fourth embodiment (FIG. 5), only one sub-rotator 221 is provided which includes the laminate film 24a having its thickness linearly changing, thereby enabling the reflection type Faraday rotator 20 to act on respective wavelengths of incident light. That is, in the reflection type Faraday rotator 20 of the fourth embodiment, incident light propagates while repeating reflection at the laminate film 24a whose thickness differs from reflection point to point. Thus, the Faraday rotation occurs at a point at which the thickness (optical length) of the laminate film 24a corresponds to the respective wavelengths of incident light.

In the fourth embodiment, the effective wavelength range can be increased, that is, the wavelength bandwidth can be increased similarly to the first embodiment, and the increase can be achieved with a relatively simple configuration. Thus, the cost can be reduced.

Figure 6:
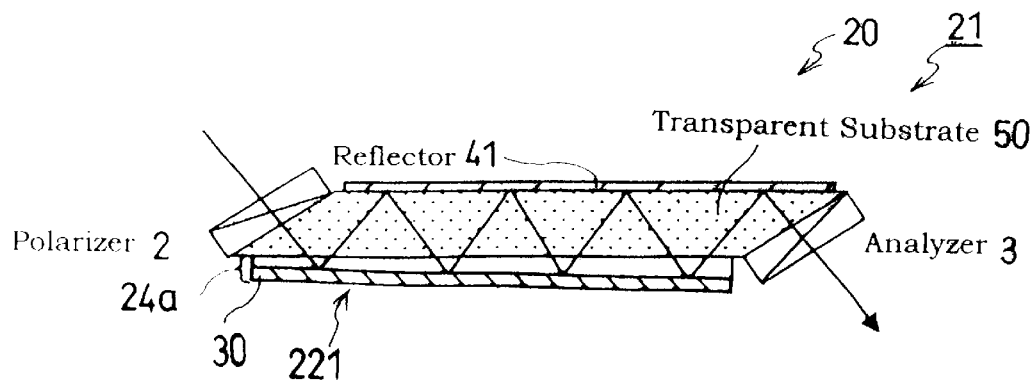
FIG. 6 is a schematic illustration of a reflection type Faraday rotator according to a fifth embodiment of the present invention.

The fourth embodiment is configured so that light from the polarizer 2 is made incident directly on the laminate film 24a. Alternatively, a reflection type Faraday rotator 20 may be configured such that a transparent substrate 50 is sandwiched between a laminate film 24a and a reflector 41 as shown in FIGS. 6 (fifth embodiment), whereby light is made incident on the transparent substrate 50. The reflector 41 may preferably be a thin film formed of metal or dielectric multilayer thin film. The metal may be hard magnetic thin film made of SmCo or the like for applying a magnetic field to a magneto-optical thin film. The polarizer 2 and the analyzer 3 may be disposed directly on the incidence and exit surfaces of the transparent substrate 50, respectively, as shown in FIG. 6.

In the fifth embodiment, the effective wavelength range can be increased, that is, the wavelength bandwidth can be increased similarly to the first embodiment, and the increase of the wavelength bandwidth can be achieved with a relatively simple structure. Thus, the cost can be reduced.

In the fifth embodiment, a sub-rotator which includes a laminate film comprising a magneto-optical thin film and at least one kind of dielectric thin film and which has reflection characteristics may be provided instead of the reflector 41.

Figure 7:
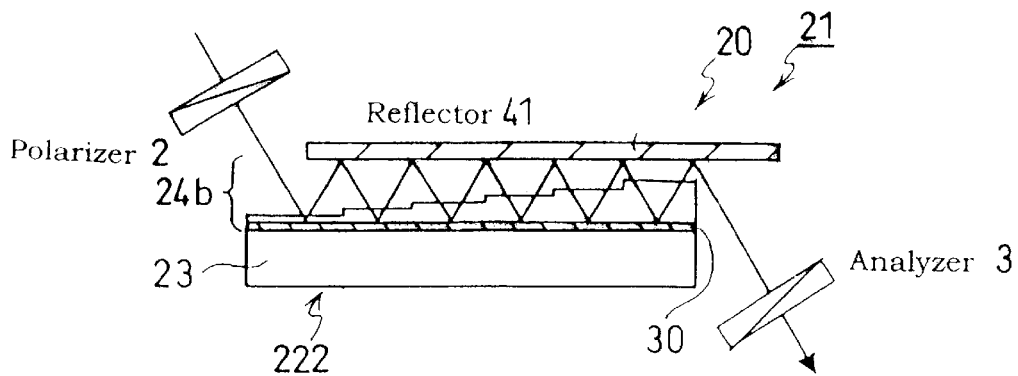
FIG. 7 is a schematic illustration of a reflection type Faraday rotator according to a sixth embodiment of the present invention.

In the reflection type Faraday rotator 20 of the fourth embodiment, the sub-rotator 221 includes the laminate film 24a whose thickness increases linearly from one end thereof toward the other end, and has reflection characteristics. Alternatively, a sub-rotator 222 which includes a laminate film 24b having its thickness stepwise increasing from one end thereof toward the other end as shown in FIG. 7, and having reflection characteristics may be provided instead of the sub-rotator 221 (six embodiment).

In the sixth embodiment, the effective wavelength range can be increased, that is, the wavelength bandwidth can be increased similarly to the fourth embodiment, and the increase of the wavelength bandwidth can be achieved with a relatively simple configuration. Thus, the cost can be reduced.

Figure 8:
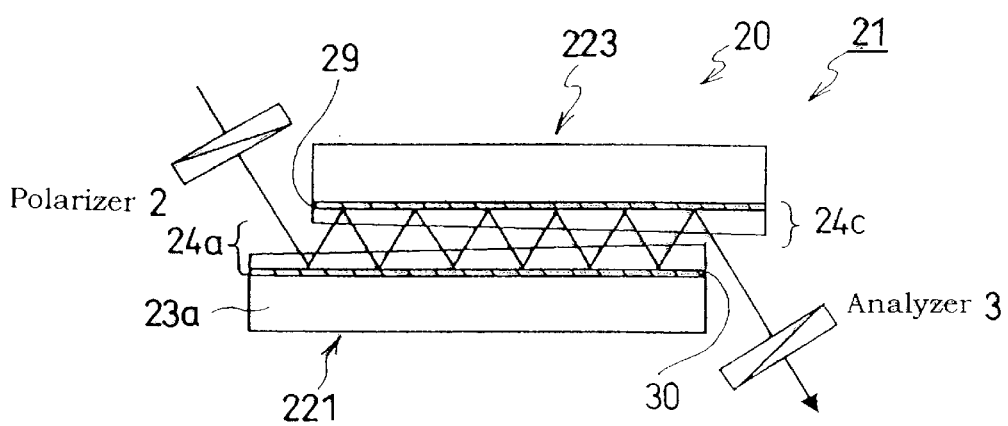
FIG. 8 is a schematic illustration of a reflection type Faraday rotator according to a seventh embodiment of the present invention.

In the constitution of the fourth embodiment (FIG. 5), a sub-rotator 223 which includes a laminate film 24c comprising a magneto-optical thin film 29 and at least one kind of dielectric thin film and which has reflection characteristics may be provided instead of the reflector 41, as shown in FIG. 8 (seventh embodiment).

In the seventh embodiment, the effective wavelength range can be increased, that is, the wavelength bandwidth can be increased similarly to the fourth embodiment and the increase of the wavelength bandwidth can be achieved with a relatively simple configuration. Thus, the cost can be reduced.

Figure 9:
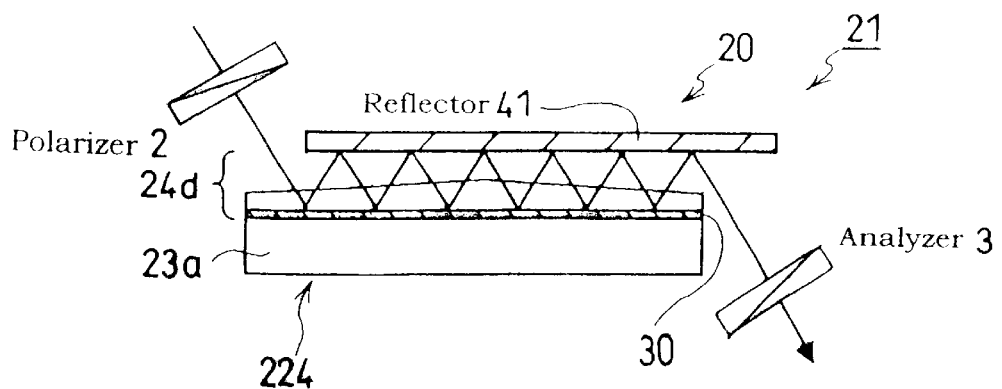
FIG. 9 is a schematic illustration of a reflection type Faraday rotator according to an eighth embodiment of the present invention.

In the fourth embodiment (FIG. 5), the sub-rotator 221 is provided which includes a laminate film 24a whose film thickness increases linearly from the left end near the polarizer 2 toward the right end near the analyzer 3. Alternatively, a sub-rotator 224 which includes a laminate film 24d whose thickness increases linearly from both ends thereof toward the center may be provided instead of the sub-rotator 221 as shown in FIG. 9 (eighth embodiment).

In the eighth embodiment, the effective wavelength range can be increased, that is, the wavelength bandwidth can be increased similarly to the fourth embodiment, and the increase of the wavelength bandwidth can be achieved with a relatively simple configuration. Thus, the cost can be reduced. In the eighth embodiment (FIG. 9), when the thickness of the laminate film 24d increases toward the center symmetrically with respect to the center of the laminate film 24d, light can be reflected at two points of the laminate film 24d located symmetrical with respect to the center and having the same thickness. In this case, the Faraday rotation angle at each reflection may be halved to 22.5°. Thus, the number of layers of the laminate film can be reduced.

Next, a reflection type Faraday rotator 20 according to a ninth embodiment of the present invention will be described with reference to FIG. 10.

Figure 10:
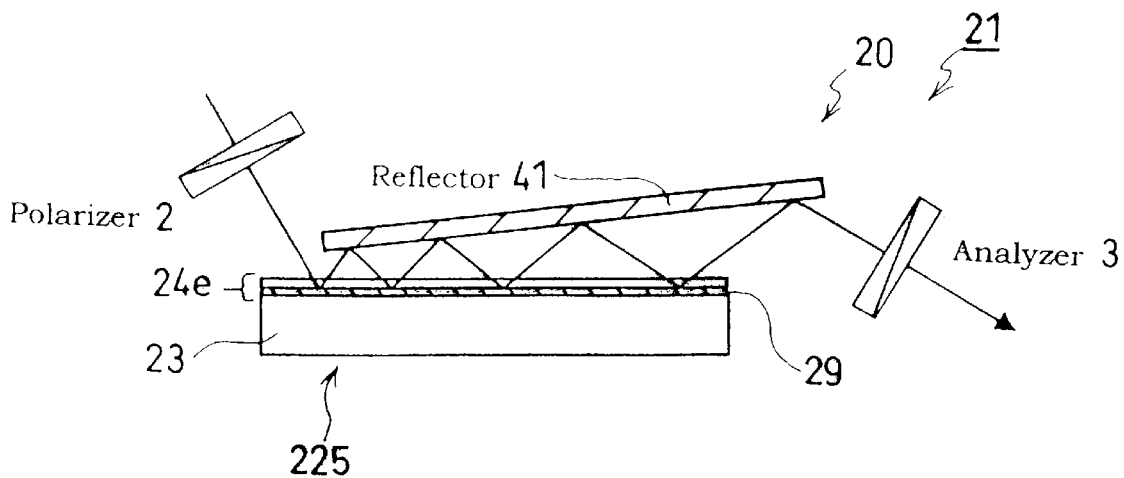
FIG. 10 is a schematic illustration of a reflection type Faraday rotator according to a ninth embodiment of the present invention.

The reflection type Faraday rotator 20 of the ninth embodiment comprises generally a sub-rotator 225 and at least one reflector 41 as shown in FIG. 10. The sub-rotator 225 comprises a substrate 23a and a laminate film 24e formed on the substrate 23a and having a constant thickness, and has reflection characteristics. The reflector 41 is arranged so as to face the laminate film 24e at a predetermined inclination angle and receives and reflects reflected light from the sub-rotator 225.

Light made incident on one end surface (the left side shown m FIG. 10) of the laminate film 24e propagats between the laminate film 24e and the reflector 41 while repeating reflection at the laminate film 24e and at the reflector 41, and finally exits from the other end surface (the right side shown in FIG. 10) thereof.

In the reflection type Faraday rotator 20 of the ninth embodiment, the incidence position on the laminate film 24e is changed at each reflection, and the reflector 41 is not in parallel to the laminate film 24e, which changes the incidence angle with respect to the laminate film 24e.

The change of the incidence angle causes the optical length to change, and thus the center wavelength of the sub-rotator 225 is changed. Accordingly, the Faraday rotation occurs at a reflection point where the center wavelength is equal to the wavelength of incident light. At other reflection points, no Faraday rotation occurs. The incident light exits from the other end surface of the laminate film 24e as outgoing light after total reflections.

A physical mechanism for fine-adjusting the positional relationship between the reflector and the laminate film may be provided which enables fine adjustment of the optical characteristics.

In the ninth embodiment, the effective wavelength range can be increased, that is, the wavelength bandwidth can be increased similarly to the first embodiment and the increase of the wavelength bandwidth can be achieved with a relatively simple configuration. Thus, the cost can be reduced.

Figure 11:
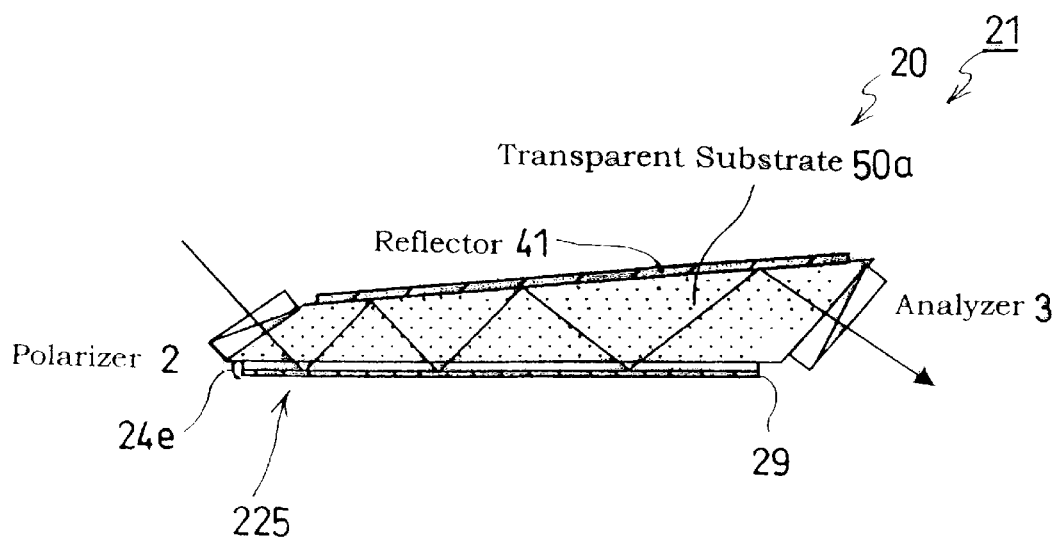
FIG. 11 is a schematic illustration of a reflection type Faraday rotator according to a tenth embodiment of the present invention.

In the ninth embodiment (FIG. 10), light is made incident directly on the laminate film 24e, but may be made incident thereon via a transparent substrate 50a which is sandwiched a laminate between film 24e and a reflector 41, as shown in FIG. 11 (tenth embodiment). The polarizer 2 and the analyzer 3 may be provided directly on respective end surfaces of the transparent substrate 50a, which light is made incident on and exits out from, respectively.

In the tenth embodiment, the effective wavelength range can be increased, that is, the wavelength bandwidth can be increased similarly to the first embodiment and the increase of the wavelength bandwidth can be attained with a relatively simple configuration. Thus, the cost can be reduced.

In the constitution of the tenth embodiment, a sub-rotator which includes a laminate film at least comprising a magneto-optical thin film and at least one kind of dielectric thin film, and which has reflection characteristics may be provided instead of the reflector 41.

According to the present invention, incident light from the outside is made incident on a plurality of sub-rotators sequentially while repeating reflection. The Faraday rotation occurs at a sub-rotator whose center wavelength is equal to the wavelength of light. The plurality of sub-rotators each have reflection characteristics (that is, a reflection type), have a larger bandwidth of outgoing light compared to a transmission type, and have wavelength characteristics (center wavelength) different from one another. Thus, the effective wavelength range can be increased, that is, the wavelength bandwidth can be increased. No expensive optical devices may be used such as prism spectroscopes and diffraction gratings, which are conventionally needed to increase the wavelength bandwidth. The wavelength bandwidth can be increased by a relatively simple configuration. Thus, the cost can be reduced.

Incident light from the outside is made incident on at least three sub-rotators while repeating reflection. The Faraday rotation occurs at a sub-rotator whose center wavelength is equal to the wavelength of light. If three sub-rotators are provided, at least one sub-rotator has a different wavelength characteristic from another two sub-rotators whereby its bandwidth of outgoing light gets larger compared to a transmission type.

Since the thickness of the laminate film, at which light repeats reflection, differs from reflection point to point, a Faraday rotation occurs at a point where the thickness (optical length) of the laminate film corresponds to the wavelength of incident light.

Also, since incidence angle on the laminate, at which light repeats refection, film differs from reflection point to point, and since the reflector is not positioned in parallel to the sub-rotator, the incidence angle with respect to the laminate film is changed thereby changing the optical length and further the center frequency.

In the multiple reflection structure one reflection need not cause a 45 degree Faraday rotation. The 45 degrees may be aggregation resulted from a plurality of reflections. Accordingly, the number of layers can be reduced.

What is claimed is:

1. A reflection Faraday rotator comprising a plurality of sub-rotators which each include a laminate film at least comprising a magneto-optical thin film and at least one kind of dielectric thin film, have reflection characteristics, have wavelength characteristics different from one another, and which are arranged so that reflected light from one sub-rotator is made incident on another sub-rotator in sequence.

2. A reflection Faraday rotator according to claim 1, wherein the laminate film comprises:
   two periodic dielectric multilayer films each comprising two kinds of dielectric thin films having refractive indexes different from each other;
   a magneto-optical thin film sandwiched between the two periodic dielectric multilayer films; and
   a metal thin film formed on a side of one periodic dielectric multilayer films of the two opposite to a side in contact with the magneto-optical thin film and adapted to reflect light.

3. A reflection Faraday rotator comprising at least three sub-rotators which each include a laminate film at least comprising a magneto-optical then film and at least one kind of dielectric thin film, have reflection characteristics, wherein at least two sub-rotators have an identical wavelength characteristic but a different wavelength characteristic from at least one sub-rotator, and which are arranged so that reflected light from one sub-rotator is made incident on another sub-rotator in sequence.

4. A reflection Faraday rotator according to claim 3, wherein the laminate film comprises:
   two periodic dielectric multilayer films each comprising two kinds of dielectric thin films having refractive indexes different from each other;
   a magneto-optical thin film sandwiched between the two periodic dielectric multilayer films; and
   a metal thin film formed on a side of one periodic dielectric multilayer films of the two opposite to a side in contact with the magneto-optical thin film and adapted to reflect light.

5. A reflection Faraday rotator comprising:
   at least one sub-rotator which each include a laminate film at least comprising a magneto-optical thin film and at least one kind of dielectric thin film and having a constant thickness, and which has reflection characteristics; and
   at least one reflector which is disposed so as to face the laminate film of the sub-rotator thereby receiving and reflecting reflected light from the sub-rotator.

6. A reflection Faraday rotator according to claim 5, wherein the laminate film comprises:
   two periodic dielectric multilayer films each comprising two kinds of dielectric thin films having refractive indexes different from each other;
   a magneto-optical thin film sandwiched between the two periodic dielectric multilayer films; and
   a metal thin film formed on a side of one periodic dielectric multilayer films of the two opposite to a side in contact with the magneto-optical thin film and adapted to reflect light.

7. A reflection type Faraday rotator comprising:
   at least one sub-rotator which each include a laminate film at least comprising a magneto-optical thin film and at least one kind of dielectric thin film and having a thickness changed linearly or stepwise, and which has reflection characteristics; and at least one reflector which is disposed so as to face the laminate film of the sub-rotator thereby receiving and reflecting reflected light from the sub-rotator.

8. A reflection Faraday rotator according to claim 7, wherein a transparent substrate is sandwiched between the laminate film and the reflector.

9. A reflection Faraday rotator according to claim 8, wherein the laminate film comprises:

two periodic dielectric multilayer films each comprising two kinds of dielectric thin films having refractive indexes different from each other;

a magneto-optical thin film sandwiched between the two periodic dielectric multilayer films; and a metal thin film formed on a side of one periodic dielectric multilayer films of the two opposite to a side in contact with the magneto-optical thin film and adapted to reflect light.

10. A reflection Faraday rotator according to claim 7, wherein the laminate film comprises:

two periodic dielectric multilayer films each comprising two kinds of dielectric thin films having refractive indexes different from each other;

a magneto-optical thin film sandwiched between the two periodic dielectric multilayer films; and a metal thin film formed on a side of one periodic dielectric multilayer films of the two opposite to a side in contact with the magneto-optical thin film and adapted to reflect light.

11. A reflection type Faraday rotator comprising:

at least one sub-rotator which each include a laminate film at least comprising a magneto-optical thin film and at least one kind of dielectric thin film and having a constant thickness, and which has reflection characteristics; and at least one reflector which is disposed so as to face the laminate film of the sub-rotator at a predetermined inclination angle with respect to the laminate film thereby receiving and reflecting reflected light from the sub-rotator.

12. A reflection Faraday rotator according to claim 11, wherein a transparent substrate is sandwiched between the laminate film and the reflector.

13. A reflection Faraday rotator according to claim 11, wherein the laminate film comprises:

two periodic dielectric multilayer films each comprising two kinds of dielectric thin films having refractive indexes different from each other;

a magneto-optical thin film sandwiched between the two periodic dielectric multilayer films; and a metal thin film formed on a side of one periodic dielectric multilayer films of the two opposite to a side in contact with the magneto-optical thin film and adapted to reflect light.

14. A reflection Faraday rotator comprising:

at least one first sub-rotator which each include a laminate film at least comprising a magneto-optical thin film and at least one kind of dielectric thin film and having a thickness changed linearly or stepwise, and which has reflection characteristics; and at least one second sub-rotator which includes a laminate film at least comprising a magneto-optical thin film and at least one kind of dielectric thin film, and which has reflection characteristics is disposed so as to face the laminate film of the first sub-rotator thereby receiving and reflecting reflected light from the first sub-rotator.

15. A reflection Faraday rotator according to claim 14, wherein a transparent substrate is sandwiched between the laminate film and the at least second sub-rotator.

16. A reflection Faraday rotator according to claim 14, wherein the laminate film comprises:

two periodic dielectric multilayer films each comprising two kinds of dielectric thin films having refractive indexes different from each other;

a magneto-optical thin film sandwiched between the two periodic dielectric multilayer films; and a metal thin film formed on a side of one periodic dielectric multilayer films of the two opposite to a side in contact with the magneto-optical thin film and adapted to reflect light.

17. A reflection Faraday rotator comprising:

at least one first sub-rotator which each include a laminate film at least comprising a magneto-optical thin film and at least one kind of dielectric thin film and having a constant thickness, and which has reflection characteristics; and at least one second sub-rotator which includes a laminate film at least comprising a magneto-optical thin film and at least one kind of dielectric thin film, and which has reflection characteristics is disposed so as to face the laminate film of the first sub-rotator at a predetermined inclination angle with respect to the laminate film thereby receiving and reflecting reflected light from the first sub-rotator.

* * * * *